L. V. FLECHTER.
CARBURETER.
APPLICATION FILED APR. 24, 1913. RENEWED JAN. 25, 1917.
1,238,122.
Patented Aug. 28, 1917.
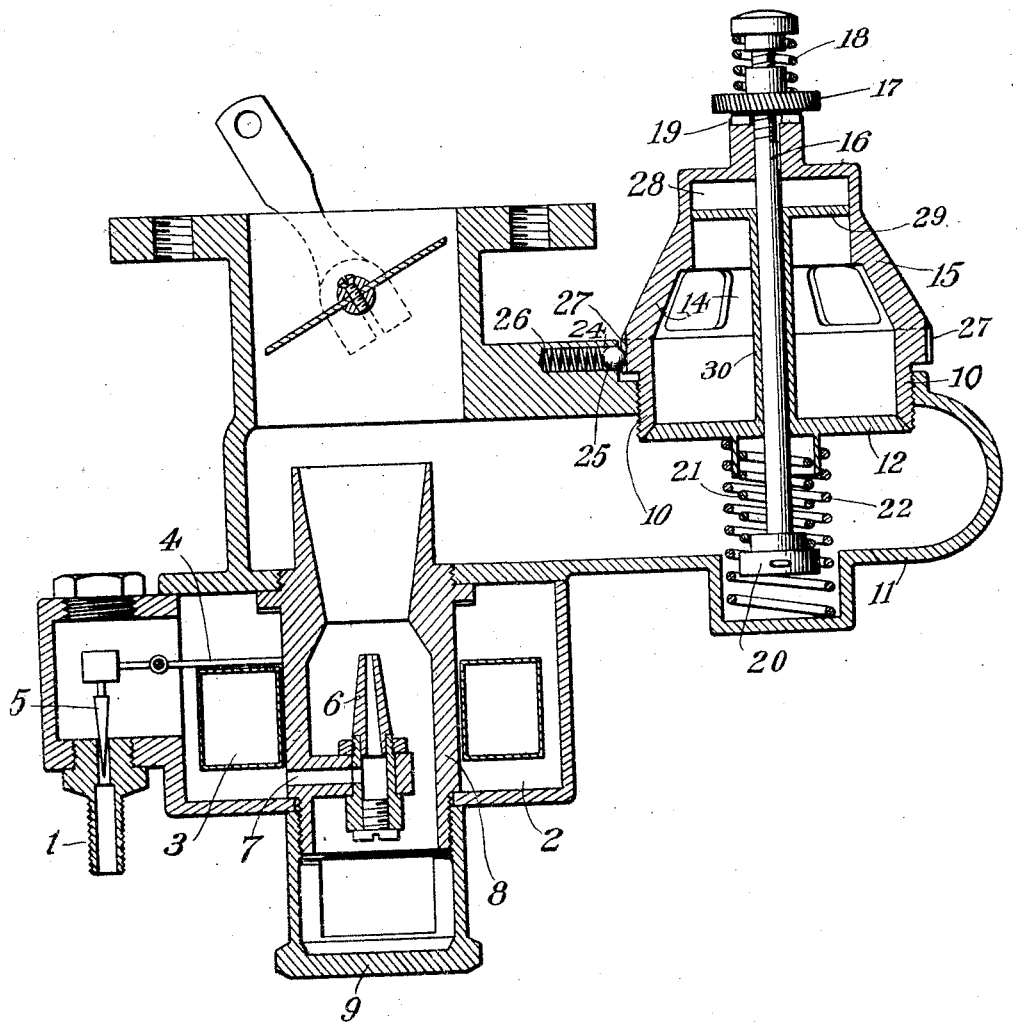

UNITED STATES PATENT OFFICE.

LEONARD V. FLECHTER, OF NEW YORK, N. Y., ASSIGNOR TO L. V. FLECHTER & COMPANY, A CORPORATION OF NEW YORK.

CARBURETER.

1,238,122. Specification of Letters Patent. Patented Aug. 28, 1917.

Application filed April 24, 1913, Serial No. 763,215. Renewed January 25, 1917. Serial No. 144,550.

*To all whom it may concern:*

Be it known that I, LEONARD V. FLECHTER, a citizen of the United States, residing at New York, in the borough of Manhattan of the city of New York, in the State of New York, have invented certain new and useful Improvements in Carbureters, of which the following is a specification.

This invention relates to carbureters, particularly such as are used in automobiles.

In carbureters of this character, an auxiliary air valve is usually provided which opens automatically with increase of suction exerted by the engine as its speed increases. This valve is usually held closed by means of one or more springs against the resistance of which the valve opens under the force exerted by the suction of the engine. It is found, however, especially when varying loads are put upon the engine, as when the automobile is traveling upon a hilly road, thus causing a variation in the speed of the engine, that a fluttering of the valve occurs owing to the change of the degree of suction exerted by the engine. When the suction increases, the valve is apt to open more than is requisite for such increase, thus compressing the springs to an undue extent, and subsequently when the springs recoil, the valve is closed to a greater extent than it should be and so the fluttering or oscillation of the valve continues on each side of the normal position tending to produce an irregular action of the engine and subjecting the sliding surfaces of the valve to undue wear.

The object of this invention is to overcome this difficulty and to this end, I provide simple means whereby a certain amount of resistance is offered to any sudden movement of the valve, thus counteracting any momentary impulse which would tend to move the valve farther than is warranted by the speed of the engine at the particular moment. This means consists of a dash pot, arranged in a convenient position, which offers some resistance to any sudden movement of the valve, but which does not interfere with the automatic adjustment of the valve corresponding to the speed of the engine. The dash pot is disposed in an extension of the adjustable valve bushing, the moving portion or plunger of the dash pot being an annular flange or head formed on the sleeve extending from the valve and sliding upon a stem which adjusts the relative positions of the springs. As located in this position, the dash pot is concealed, is not liable to get out of order and does not mar the appearance nor complicate the construction of the carbureter.

In the accompanying drawing,

The figure is a longitudinal sectional elevation of a carbureter embodying my invention.

The carbureter is supplied with fuel in the usual manner, as by a tube leading to the nipple 1, which is screwed into the casing of the float chamber 2, in which is contained a float 3, maintaining the fuel in the float chamber at a substantially constant level through the instrumentality of a lever 4, operating a needle valve 5, extending into the opening of the nipple. A fuel spraying nozzle 6 communicates with the float chamber through a passage 7 and is disposed within the usual Venturi tube 8, into which air is admitted through an apertured cup 9 attached to the bottom of the tube.

An auxiliary air inlet is provided through an annular bushing 10, threaded into the casing 11, the air supply therethrough being controlled by a valve 12. Said bushing is provided with a plurality of spaced upwardly extending posts 14 forming a spider, which converge to form and support an annular head 15 arranged centrally above the air inlet. A stem 16 is arranged centrally through the bushing which extends above the head and below the valve, and is provided near its top with a knurled nut 17 slidably mounted on the stem, which is threaded in the head 15 so that it may be rotated by said nut to adjust same. Said nut is normally held in position by a spring 18 bearing against it to force the projections 19 formed on the nut into corresponding grooves formed on the top of the head. The bottom of the stem is provided with a bearing 20 for an auxiliary resistance spring 21 normally spaced a slight distance from the bottom of the valve. A primary resistance spring 22 seating on the casing, normally holds the valve to its seat on the bushing.

When the speed of the engine rises to a point where the main air supply is inadequate, the auxiliary valve opens to a degree proportional to the increase of the suction at such speed against the tension of the springs 21 and 22, which are adjustable respectively by an adjustment of the valve bushing 10, and an adjustment of the stem. The bushing is held in its adjusted position by any suitable means, as a detent 24 comprising a spring 26 mounted in the casing and a ball 25, projected outwardly by said spring and adapted to engage in sockets or recesses 27 provided in the bushing.

In order to prevent fluttering or oscillation of the auxiliary valve, the head 15 is provided with an annular chamber 28, concentric with the bushing 10 and the valve 12 and forming a dash pot. The plunger 29 of said dash pot fits snugly therein and is slidably mounted upon and guided by the stem 16. Said plunger is operatively connected with the valve 12, preferably by means of a tubular extension 30 inclosing the stem and formed integral with the valve. Preferably the plunger constitutes a flange on said tubular extension, so that a rigid connection is provided between the valve and the plunger, having a relatively long bearing on the stem which prevents any tilting or lateral movement of either the plunger or the valve. The plunger fits the inner wall of the dash pot snugly, and thus gives the resistance necessary to obtain gradual movement of the valve and prevent fluttering or rapid pulsation thereof.

By means of this construction, the dash pot can be arranged immediately above the valve and concentric therewith. The stem which supports and guides the springs below the valve also guides the plunger. A compact, economical construction is thus obtained, which is also simple, efficient and reliable in operation.

I claim as my invention:—

1. In a carbureter, the combination with a casing, of an adjustable bushing mounted in said casing and having a valve seat forming an air inlet, a valve controlling the inlet and seating on the valve seat, a head having a chamber to form a dash-pot, orificed walls connecting the head and valve seat in mutually fixed relation, said bushing, head and walls constituting a unitary structure, a plunger slidably engaging the dash-pot, a relatively long tubular stem rigidly connecting the plunger and valve, a rod secured in the head and passing through the stem to form a guide for the valve and plunger, and to prevent tilting thereof, the portions of said rod within the tubular stem having a smooth surface and a spring in the casing bearing on the valve for yieldingly opposing the opening thereof and adapted to be adjusted to vary its tension when the bushing is adjusted.

2. In a carbureter, the combination with a casing of an adjustable bushing having a valve seat in said casing to form an air inlet, a valve adapted to engage said seat to close the inlet, a head having a chamber to form a dash-pot, orificed walls connecting the head and bushing in mutually fixed relation, a plunger slidably engaging the dash-pot, a tubular stem rigidly connecting the plunger and valve, a rod secured in the head passing through the stem to form a relatively long guide for the valve and plunger, a spring in the casing bearing on the valve for yieldingly opposing the opening thereof and adapted to be adjusted to vary its tension by the adjustment of the combined bushing, head and orificed walls, a spring on the end of the rod within the casing normally spaced from the valve and means for varying the space between the said spaced spring and valve.

3. In a carbureter, the combination with a casing having a main air inlet, of an adjustable bushing in said casing forming an auxiliary inlet and provided with a valve seat, a head formed integral with said bushing and provided with an annular recess forming a dash-pot concentric with the valve seat, a valve adapted to engage said seat to close the auxiliary air inlet, a plunger slidably mounted in the dash-pot, a tubular extension connecting the valve and plunger and a stem mounted in said extension extending above the head and below the valve, means on one end of said stem to support a resistant spring, an adjusting nut mounted on the upper end of said stem and adapted to interlock with the bushing to hold said stem against rotation, the portion of the stem within the dash-pot and tubular extension having a smooth bearing surface.

This specification signed and witnessed this 2nd day of April, A. D., 1913.

LEONARD V. FLECHTER.

Signed in the presence of—
  M. P. WINNE,
  M. J. COOPER.